May 9, 1961 G. T. KERR 2,983,580
PROCESS FOR THE MANUFACTURE OF CARBONYL SULFIDE
Filed July 22, 1959
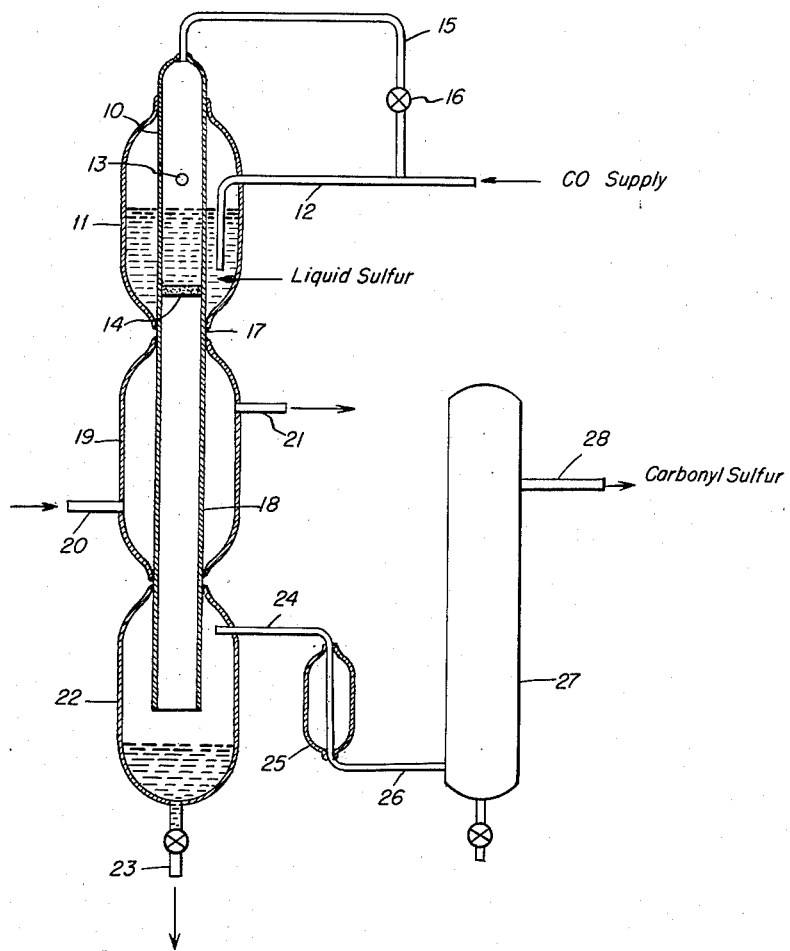
INVENTOR
George T. Kerr
BY Raymond W. Barclay
ATTORNEY

United States Patent Office 2,983,580
Patented May 9, 1961

2,983,580

PROCESS FOR THE MANUFACTURE OF CARBONYL SULFIDE

George T. Kerr, Delaware Township, Camden County, N.J., assignor to Socony Mobil Oil Company, Inc., a corporation of New York Filed July 22, 1959, Ser. No. 828,832

6 Claims. (Cl. 23—203)

This invention relates to a process for making carbonyl sulfide. More particularly, the present invention is directed to a catalytic process for the manufacture of carbonyl sulfide by reaction of elemental sulfur and carbon monoxide in the presence of a catalyst consisting essentially of a specified crystalline aluminosilicate salt.

Carbonyl sulfide is a useful chemical employed in the synthesis of a variety of other valuable compounds. Thus, urea may be readily prepared under conditions of low temperature and pressure by reaction of ammonia with carbonyl sulfide.

It has heretofore been proposed to manufacture carbonyl sulfide by the conversion of a mixture of sulfur dioxide and carbon monoxide by passage through a heated coke bed. Such process, while affording a substantial yield of carbonyl sulfide has the disadvantages of requiring extremely close control over the reaction time and the necessary use of an elevated temperature approaching 2000° F.

The present invention affords an improved process for producing carbonyl sulfide. The process of the invention involves catalytic reaction of carbon monoxide and sulfur vapor at a temperature between about 500 and about 900° F. in the presence of a crystalline aluminosilicate salt having rigid three-dimensional networks made up of unit cells characterized by the substantial absence of change in unit cell dimensions upon dehydration and rehydration and a sorption capacity at 760 mm. pressure and 25° C. of at least 4 weight percent of normal butane. The above catalyst requirements are fulfilled by certain crystalline zeolites known as molecular sieves. A high yield of carbonyl sulfide is obtained by the process of the present invention in accordance with the equation:

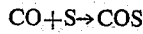

A minor proportion of carbon disulfide is also formed under the process conditions of the invention in accordance with the equation:

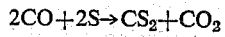

It has been found that with the use of the above-described catalyst the reaction between carbon monoxide and sulfur vapor proceeds rapidly with high selectivity to produce a commercially attractive yield of carbonyl sulfide. The temperature employed broadly is within the approximate range of 500 to 900° F. Preferably, the reaction temperature is between about 700° F. and about 800° F. Such temperature, as will be evident, is substantially lower than that necessarily employed in the above-indicated previously proposed process.

The reaction is generally carried out under substantially atmospheric pressure although the reaction pressure may vary between about 5 and about 50 p.s.i.g. The space velocity of the gaseous charge passing through the catalyst may extend over a wide range, generally between about 5 and about 25,000 volumes per volume of catalyst per hour.

In accordance with the process of the invention, sulfur vapor and carbon monoxide are advantageously combined in equimolar proportions. While a molar ratio of from 0.5 to 2 mols of carbon monoxide per mol of sulfur vapor may feasibly be employed, it is preferred to use a molar ratio of about 1:1.

The aluminosilicate salts employed as catalysts in the process of this invention are essentially dehydrated forms of crystalline siliceous zeolites containing varying quantities of sodium, calcium, and aluminum with or without other metals. All or a portion of the sodium and calcium ions normally contained in the zeolite structure may be replaced with a number of other ions. The atoms of sodium, calcium or other metals in replacement thereof, silicon, aluminum and oxygen, are arranged in a definite and consistent crystalline pattern. Such structure contains a large number of small cavities interconnected by a number of still smaller channels. These cavities and channels are precisely uniform in size. Chemically, these zeolites may be represented by the general formula:

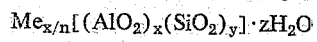

where Me is a metal cation, $x/n$ is the number of exchangeable metal cations of valence $n$, $x$ is also the number of aluminum ions combined in the form of aluminate, $y$ is the number of silicon atoms and $z$ is the number of water molecules, removal of which produces the characteristic channel system. In the above formula, the ratio $y/x$ is a number from 1 to 5 and usually from 1 to 2. Zeolites having the above characteristics have been referred to as molecular sieves. At the present time, there are commercially available molecular sieves of the "A" series and of the "X" series. A synthetic zeolite known as "Molecular Sieve 4A" is a crystalline sodium aluminosilicate having channels about 4 Angstroms in diameter. In the hydrated form, this material is chemically characterized by the formula: $Na_{12}(AlO_2)_{12}(SiO_2)_{12}\cdot 27H_2O$. The synthetic zeolite known as "Molecular Sieve 5A" is a crystalline aluminosilicate salt having channels about 5 Angstroms in diameter and in which substantially all of the 12 ions of sodium in the immediately above formula are replaced by calcium, it being understood that calcium replaces sodium in the rate of one calcium ion for two sodium ions. A crystalline sodium aluminosilicate which has pores or channels of approximately 13 Angstrom units in diameter is also available commercially under the name of "Molecular Sieve 13X." The letter "X" is used to distinguish the interatomic structure of this zeolite from that of the "A" crystals mentioned above. As prepared, the 13X material contains water and has the unit cell formula $Na_{86}[(AlO_2)_{86}(SiO_2)_{106}]\cdot 267H_2O$. The parent zeolite is dehydrated to make the active catalyst. The 13X crystal is structurally identical with faujasite, a naturally occurring zeolite. Faujasite, however, is not identical in composition with the 13X zeolite. The synthetic zeolite known as "Molecular Sieve 10X" is a crystalline aluminosilicate salt having channels above 10 Angstrom units in diameter and in which a substantial proportion of the sodium ions of the 13X material have been replaced by calcium.

Molecular sieves of the "X" series are characterized by the formula:

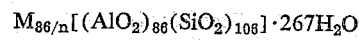

where M is Na+ or Ca++ or other alkali metal or alkaline earth metal ions introduced by replacement thereof and $n$ is the valence of the cation M. The structure consists of a complex assembly of 192 tetrahedra in a large cubic unit cell 24.95 A. on an edge. The effective pore diameter is 10 to 13 A. and the adsorption volume is about 0.35 cc./gram of dehydrated zeolite.

For molecular sieves of this series, in the empirical formula:

$$M_{2/n}O \cdot Al_2O_3 \cdot XSiO_2 \cdot YSiO_2$$

X has an average value of 2.5±0.5. The value of Y, depending on the condition of hydration and on the metal cation present may vary from 8 to 0. The average value of Y for the completely hydrated sodium zeolite of the "X" series is 6.2.

Under the conditions of the process described hereinabove, preference is accorded alkali metal aluminosilicate salts and particularly alkali metal aluminosilicates having a uniform structure characterized by pores of approximately 13 A. in diameter. Sodium aluminosilicate of such characteristics, i.e. Molecular Sieve 13X, has specifically been found to possess unusual catalytic properties in the reaction of carbon monoxide and sulfur to yield carbonyl sulfide and such material is accordingly particularly preferred for use as a catalyst in the process of the invention.

It is contemplated that the reactants of carbon monoxide and sulfur vapor may be contacted to yield carbonyl sulfide in the presence of the above-described catalyst in any feasible manner. One suitable system in schematic form for accomplishing the desired reaction is shown by the figure of the attached drawing.

Referring more particularly to this figure, a cylindrical reactor 10 is surrounded by an outer jacket 11. The jacket is externally heated by means not shown and contains sulfur, which at reaction temperature, is in the molten state. Carbon monoxide is passed through a gas inlet pipe 12 which pierces the wall of jacket 11 and extends below the level of the liquid sulfur contained therein. Just above the liquid sulfur level is an aperture 13 leading into the reactor 10. Positioned near the bottom of jacket 11 within the reactor 10 is a sintered disc 14 upon which the catalyst rests. Carbon monoxide may be introduced into the reactor through two routes; one path being through inlet pipe 12 and the other through conduit 15, provided with control valve 16. Passage of carbon monoxide through conduit 15 permits the same to by-pass the sulfur and to enter directly into the top of the reactor. By adjusting the relative volumes of carbon monoxide entering each route, desired ratios of sulfur vapor and carbon monoxide may be readily controlled and passed through the layer of particle-form catalyst.

Gaseous products passing from the reactor are conducted through outlet pipe 17 to a sulfur condenser 18 wherein unreacted sulfur vapor undergoes condensation. Condenser 18 is surrounded by an outer jacket 19 and is maintained at a temperature of about 120° C. by the passage and withdrawal of steam respectively through inlet 20 and outlet 21. Condensed liquid sulfur is separated from the gaseous product in gas-liquid separator 22 and is withdrawn from the system through outlet 23. The resulting gaseous product is conducted through a pipe 24 to a trap 25 maintained at approximately −78° C. where it is condensed. The condensed product is conducted through line 26 to distillation column 27 wherein separation is effected by fractional distillation. The desired product stream of carbonyl sulfide is withdrawn through outlet 28.

The following examples will serve to illustrate the process of the invention without limiting the same.

*Example 1*

Carbon monoxide and sulfur were conducted into a reactor of the type shown in the accompanying figure at rates of one mole each per hour. The reaction temperature was 750° F. Unreacted sulfur was condensed below the reactor outlet and the gas product stream was examined. In the absence of catalyst, the gas failed to yield condensate at −78° C. and mass spectrometer analysis indicated the presence of 92.5 mol percent carbon monoxide, 3.7 mol percent nitrogen, 2 mol percent carbonyl sulfide and minor proportions of air and carbon dioxide.

With the unit on stream 1 gram of Molecular Sieve 13X pellets was placed on the sintered disc. Almost immediately, the sulfur make visibly decreased and the product yielded condensate in a trap cooled to −78° C. Upon heating the trap, about three-fourths of the liquid boiled off considerably below room temperature leaving a liquid residue containing carbon disulfide. Mass spectrometer analysis of the off-gas disclosed the presence of only 13.9 mol percent carbon monoxide, 67.9 mol percent carbonyl sulfide, 15.8 mol percent carbon dioxide and small amounts of nitrogen, carbon disulfide and hydrogen sulfide.

A comparative analyses of the products in the absence and presence of the specified catalyst are shown below:

| Component | Mol Percent | |
|---|---|---|
| | No Catalyst | With 13X Catalyst |
| CO | 92.5 | 13.9 |
| CO₂ | trace | 15.8 |
| COS | 2 | 67.9 |
| CS₂ | 0 | trace |
| H₂S | 0 | trace |
| N₂ | 3.7 | trace |

*Example 2*

In the apparatus previously described, another series of reactions was run in the same manner as described in Example 1. The mass spectrometer analyses of the reaction product gases are shown below:

| Component | Mol Percent | |
|---|---|---|
| | No Catalyst | With 13X Catalyst |
| CO | 94.4 | 8.5 |
| CO₂ | trace | 9.2 |
| COS | 5.4 | 74.3 |
| CS₂ | trace | trace |
| H₂S | 0 | 6.8 |
| N₂ | 0 | trace |

It will be evident from the foregoing that a high yield of carbonyl sulfide is obtainable upon reaction of sulfur vapor and carbon monoxide under the specified reaction conditions in the presence of a catalyst of a crystalline aluminosilicate salt having rigid three-dimensional networks made up of unit cells characterized by a uniform pore size.

It is to be understood that the above description is merely illustrative of preferred embodiments of the invention, of which many variations may be made by those skilled in the art without departing from the spirit thereof.

I claim:

1. A process for producing carbonyl sulfide by reacting carbon monoxide and sulfur vapor in a molar ratio of between about 0.5 and about 2, at a temperature about 500 and about 900° F. in the presence of a catalyst of a crystalline aluminosilicate salt having rigid three-dimensional networks made up of unit cells characterized by the substantial absence of change in unit cell dimensions on dehydration and rehydration and a sorption capacity at 760 mm. pressure and 25° C. of at least 4 weight percent of normal butane.

2. A process for producing carbonyl sulfide by reacting carbon monoxide and sulfur vapor in a molar ratio of between about 0.5 and about 2, at a temperature between about 500 and about 900° F. in the presence of a catalyst of a crystalline alkali metal aluminosilicate having rigid three-dimensional networks made up of unit cells characterized by the substantial absence of unit cell dimensions upon dehydration and rehydration, a uniform pore size of about 13 Angstroms in diameter and a sorption capacity at 760 mm. pressure and 25° C. of at least 4 weight percent of normal butane.

3. A process for producing carbonyl sulfide by reacting carbon monoxide and sulfur vapor in a molar ratio of between about 0.5 and about 2, at a temperature between about 500 and about 900° F. in the presence of a catalyst of a crystalline sodium aluminosilicate having rigid three-dimensional networks made up of unit cells characterized by the substantial absence of change in unit cell dimensions upon dehydration and rehydration, a uniform pore size of about 13 Angstroms in diameter and a sorption capacity at 760 mm. pressure and 25° C. of at least 4 weight percent of normal butane.

4. A process for producing carbonyl sulfide by reacting carbon monoxide and sulfur vapor in substantially equimolar proportions at a temperature in the approximate range of 700 to 800° F. in the presence of a catalyst of a crystalline aluminosilicate salt having rigid three-dimensional networks made up of unit cells characterized by the substantial absence of change in unit cell dimensions on dehydration and rehydration and a sorption capacity at 760 mm. pressure and 25° C. of at least 4 weight percent of normal butane.

5. A process for producing carbonyl sulfide by reacting carbon monoxide and sulfur vapor in substantially equimolar proportions at a temperature in the approximate range of 700 to 800° F. in the presence of a catalyst of a crystalline alkali metal aluminosilicate having rigid three-dimensional networks made up of unit cells characterized by the substantial absence of unit cell dimensions upon dehydration and rehydration, a uniform pore size of about 13 Angstroms in diameter and a sorption capacity at 760 mm. pressure and 25° C. of at least 4 weight percent of normal butane.

6. A process for producing carbonyl sulfide by reacting carbon monoxide and sulfur vapor in substantially equimolar proportions at a temperature in the approximate range of 700 to 800° F. in the presence of a catalyst of a crystalline sodium aluminosilicate having rigid three-dimensional networks made up of unit cells characterized by the substantial absence of change in unit cell dimensions upon dehydration and rehydration, a uniform pore size of about 13 Angstroms in diameter and a sorption capacity at 760 mm. pressure and 25° C. of at least 4 weight percent of normal butane.

References Cited in the file of this patent

UNITED STATES PATENTS

| | | |
|---|---|---|
| 2,494,587 | Shabaker | Jan. 17, 1950 |
| 2,882,243 | Milton | Apr. 14, 1959 |

FOREIGN PATENTS

| | | |
|---|---|---|
| 561,794 | Canada | Aug. 12, 1958 |